LINING RING ASSEMBLY FOR ROCK CRUSHERS

Original Filed Oct. 21, 1966 2 Sheets-Sheet 1

INVENTOR.
MARLAND G. CURTIS
BY Wells & St John
ATTYS.

LINING RING ASSEMBLY FOR ROCK CRUSHERS

Original Filed Oct. 21, 1966 2 Sheets-Sheet 2

INVENTOR.
MARLAND G. CURTIS
BY Wells & St John
ATTYS.

United States Patent Office

Re. 26,923
Reissued June 30, 1970

26,923

LINING RING ASSEMBLY FOR ROCK CRUSHERS

Marland G. Curtis, % Curtis Construction Company, Box 106, Spokane, Wash. 99210

Original No. 3,406,917, dated Oct. 22, 1968, Ser. No. 588,538, Oct. 21, 1966. Application for reissue Mar. 13, 1969, Ser. No. 817,223
Int. Cl. B02c *2/04, 23/00*
U.S. Cl. 241—294 14 Claims

Matter enclosed in heavy brackets [ ] appears in the original patent but forms no part of this reissue specification; matter printed in italics indicates the additions made by reissue.

*ABSTRACT OF THE DISCLOSURE*

*Liner ring for a conical crushing part of a gyratory type crusher. The liner comprises segmented wear members joined at tapered ends and supported against the crushing part by interlocking shoulders provided on the back surface of the wear members and the outer surface of the crusher part. By employing a segmented liner, the metal used in the casting thereof can be of greater hardness than for full circle liners.*

This invention relates to a lining ring assembly for rock crushers, particularly relating to the lining of the mantle in a gyratory type crusher.

Gyrating type rock crushers commonly are provided with an upper stationary bowl and a lower gyrating mantle, each provided with opposed frusto-conical grinding surfaces in the form of lining members which require periodical replacement. These lining members are typically formed as complete circular members with continuous frusto-conical surfaces. The rather large size of rock crushers limits the availability of such liners, which must be cast in a foundry capable of handling large circular castings with considerable accuracy. In addition, the desirability of using hard metal alloys in such castings, generally containing manganese, contributes to the difficulty of supplying the liners and adds considerably to the expense of the liners when they are cast in one continuous piece.

Under the scope of the invention described herein, the lining ring forming the mantle for the rock crusher is divided into two circular pieces, one being a permanent mounting ring fixed to the crusher head, the other being made up of a plurality of segmented members which fit together with one another on the mounting ring to provide the desired grinding surface. By reducing the individual size of the members used to complete the segmented liner, it is possible to cast the hard metal alloy liner in smaller foundry facilities, and only the expendable lining members need be cast from the more expensive hard metal alloys required for grinding operations. In fact, the segmented lining members can be effectively cast of material of greater hardness than is practical when casting the full circle liner under conventional methods.

It is a first object of this invention to reduce the cost and difficulty required in replacing the mantle liner in a conventional rock crusher.

Another object of this invention is to provide a permanent mounting ring which interlocks with a series of segmented lining members to complete a mantle assembly in a rock crusher. All of the interlocked parts in the final assembly are held in place by the conventional mantle extension.

Another object of this invention is to provide segmented lining members which can be inserted in the crusher or removed with a minimum of difficulty and skill. The positioning of the lining members on the crusher head is automatic due to the complementing surface configurations of the mounting ring and the segmented lining members.

These and further objects will be evident from the following disclosure, taken together with the accompanying drawings, which disclose a preferred form of the invention. It is to be understood that this form of the invention is only presented by way of example and that minor modifications could be made within the scope of the disclosure.

In rock crushers of the gyrating type, rock particles are reduced in size by the gyratory grinding action of a crusher head having a circular mantle thereon which cooperates with an opposed circular lining member on a stationary bowl. The present device provides a more economical means for periodically replacing the wearing surfaces of the mantle and further minimizes the difficulties inherent in casting a one piece lining apparatus as is conventional today. Such rock crushers often require lining members of hardened alloy having a diameter of 5 feet or more. The difficulty in casting a ring of such size limits the source of supply of the lining members and also seriously increases the costs involved in such production.

Figure 1:
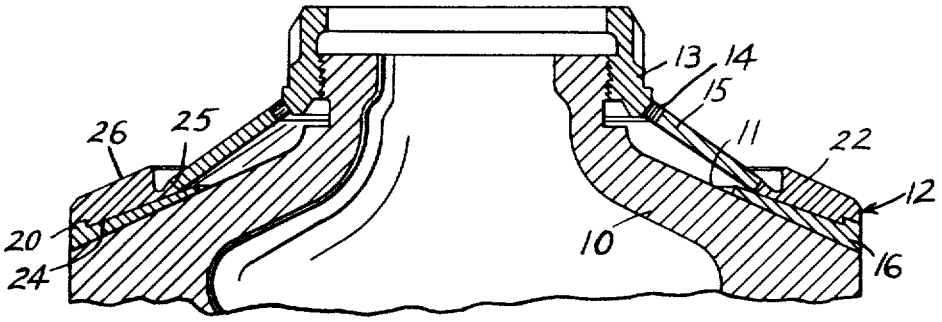
FIGURE 1 is a fragmentary vertical sectional view taken through the upper portion of a typical crusher head assembly.

As seen in FIGURE 1, a typical crusher head 10 includes a frusto-conical surface 11 which faces upwardly toward the surfaces of a stationary bowl (not shown). The crusher head is suitably mounted in a supporting frame for gyratory movement, wherein it does not rotate, but progresses angularly upward about its circumference.

Mounted on the surface 11 is the mantle, generally designated by the numeral 12. This conventionally has been cast as a one piece ring formed with the desired upper surface configuration for grinding purposes. As illustrated in the drawings, it is now composed of two basic pieces, the upper members being angularly segmented. The mantle 12 is held in place by a conventional locking ring 13 threadably engaged with the crusher head 10. The ring 13 secures a mantle extension 15 and torch ring 14. The mantle extension 15 is coaxial about the upright center axis of the crusher head 10. It includes an outer edge which is circular in configuration and which abuts the mantle to center it and lock it in place on the surface 11.

The first member comprising the mantle 12 is a stationary mounting ring 16 having a lower surface 17 that is complementary to the surface 11 of the crusher head 10. The surface 17 is frusto-conical in configuration and its inner and outer edges are positioned on the crusher head 10 in coaxial alignment with the axis of the crusher head 10.

The upper surface 18 of the mounting ring 16 is also frusto-conical in configuration, but its downward slope is less than the slope of surfaces 11 and 17. Furthermore, it is provided with an upwardly extending shoulder 20 adjacent to its outer periphery, the surface 18 being intercepted by an inwardly facing surface 21 at the inner edge of shoulder 20. The surface 21 is substantially vertical and forms an acute angle relative to surface 18.

Figure 2:
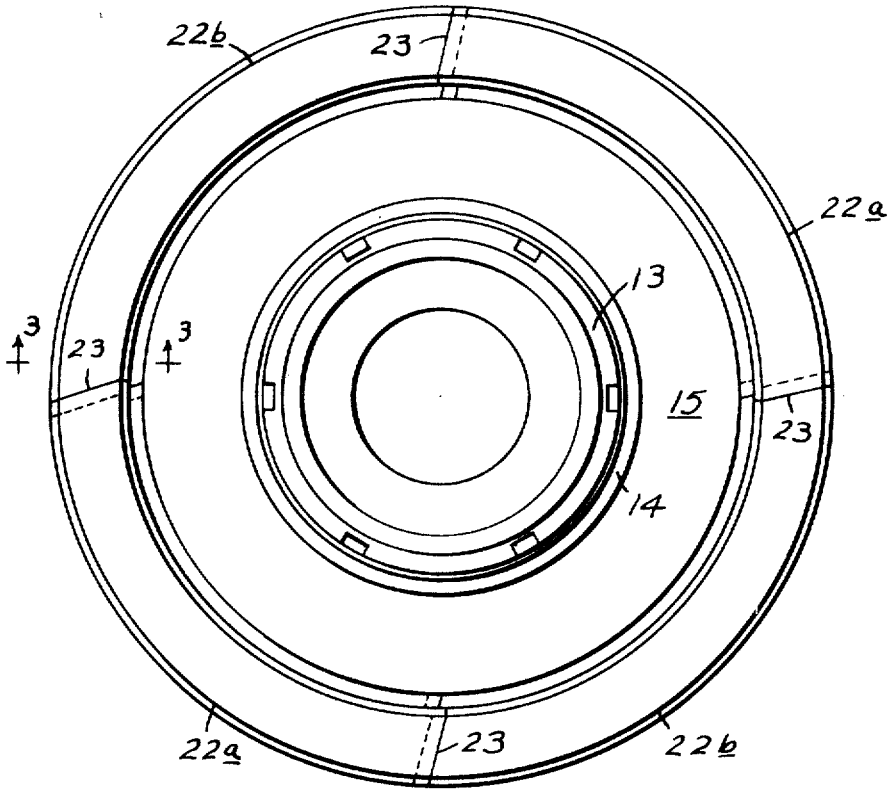
FIGURE 2 is a top view of the assembly shown in FIGURE 1.
Figure 3:
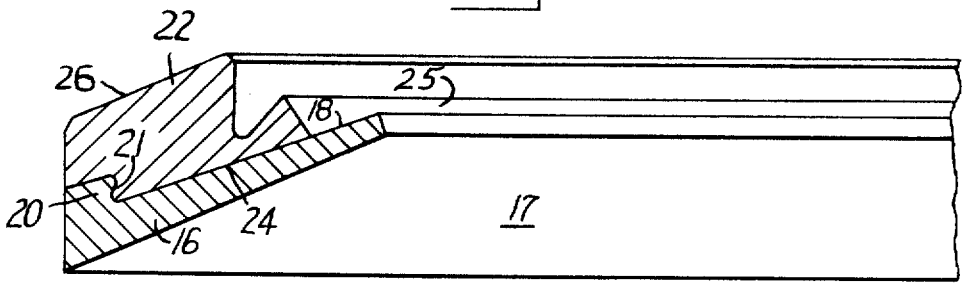
FIGURE 3 is an enlarged sectional view through the lining members as shown along line 3—3 in FIGURE 2.
Figure 4:
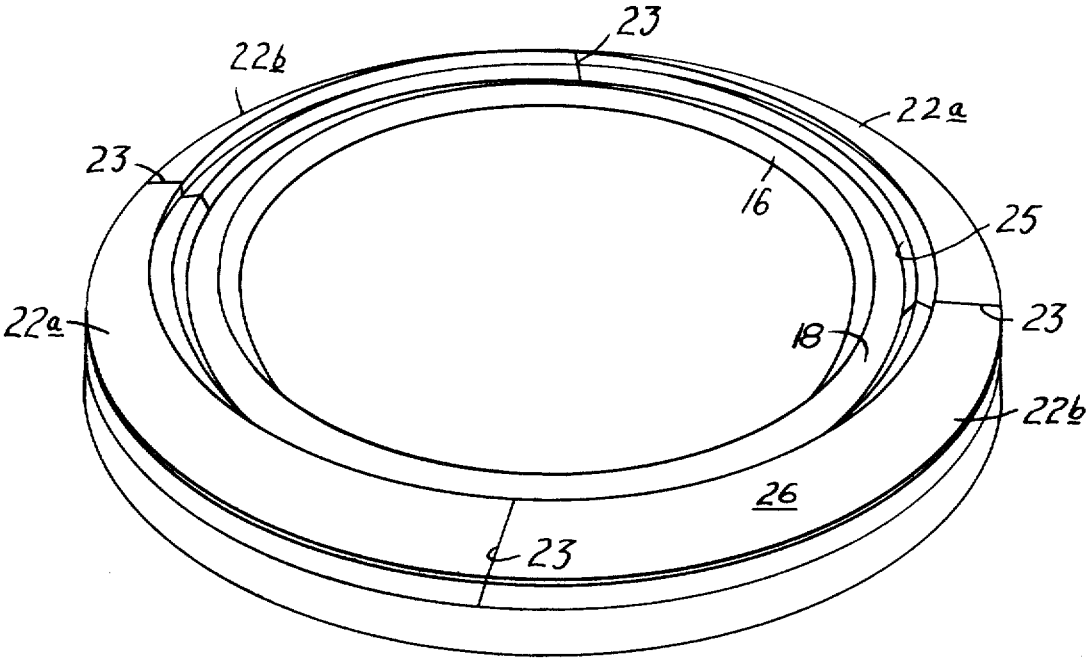
FIGURE 4 is a front perspective view of the lining members as assembled.

The wearing members which actually accomplish the grinding are segmented at best seen in FIGURES 2 and 4. As illustrated, there are four segmented lining members 22, these being divided into two pairs, each pair including a member 22a and a complementary member 22b. The positions of members 22a and 22b are alternated progressively about the circumference of the crusher head 10.

The cross sectional configuration of each member 22 is identical, the differences between the members 22a and 22b being relative to the angular configurations of their end surfaces 23. The end surfaces 23 are formed along a plane that is nonparallel to the axis of crusher head 10 and which are not radial relative to this axis. Thus, the segmented lining members 22a have end surfaces 23 which are tapered inwardly from the inner edge of the member toward its outer edge, and which also are tapered inwardly from its upper surface to its lower surface. The end surfaces 23 of the members 22b are formed just oppositely, so as to fit in adjacent abutting positions relative to the end surfaces 23 of members 22a.

Each member 22 has a lower surface 24 formed with a cross sectional configuration complementary to the cross sectional configuration of the upper surface 18 and shoulder 20 formed on the mounting ring 16. In addition, the lining members, 22 have formed thereon an inwardly facing edge 25 which, when positioned on the mounting ring 16, is complementary to the outer edge of the mantle extension 15 and adapted to be abutted thereby.

In assembling mantle 12 on the crusher head 10, it is necessary first to permanently attach the circular mounting ring 16 in a coaxial position relative to the axis of crusher head 10. The mounting ring 16, since it's more or less permanent in nature, can be adhered to the crusher head 10 by any suitable means, such as an adhesive material. The ring 16 can be made of steel or other suitable metal, and need not be formed of the more expensive hardened alloys required for grinding purposes.

The segmented lining members are placed about the mounting ring in successive adjacent positions, beginning with one of the members 22b so that the final member inserted is one of the members 22a. The member 22a, since it tapers from the inside to the outside edges and from the top surfaces to the bottom surfaces, can be moved outwardly to fit into the assembly and complete the full circle lining member. It can successfully interlock with the shoulder 20 of the mounting ring 16 to accurately place all of the segmented lining members in the desired coaxial position relative to the axis of crusher head 10. The mantle extension 15 is then brought into contact with the inner edges 25 of the members 22 to apply an equal outwardly directed force against all of the members 22, holding them securely against the interlocking connection provided by the shoulder 20. It is to be noted that the upper grinding surfaces 26 of the members 22 are substantially parallel to the upper surface 11 of the crusher head 10. It also is to be noted that the end edges 25 are not perpendicular to the upper surfaces 26. and are positioned so that the force exerted by the mantle extension 15 actually serves to hold the inner edges of the lining members 22 downwardly against the mounting ring 16 and crusher head 10. The tapered nature of the surfaces 23 serve further to interlock members 22 in the final assembly when held by mantle extension 15.

The principal advantage of this structure is the ease of replacement of the lining members 22, which are subjected to considerable wear during use. The members 22 can be readily replaced without requiring the use of adhesives or other permanent or temporary holding devices other than the conventional mantle extension 15, in addition, since the lining members 22 are angularly segmented the castings required to produce these members are greatly lessened in size and can be cast by foundries without capacity to cast the large circular ring otherwise required. Since only the lining members 22 need be cast of hardened alloys such as alloys of manganese, the cost of a complete mantle 12 is greatly lessened. In addition, I have found it practical to use alloys, for the lining members 22 in segments which are much harder than is practical when casting a full circle lining member.

Many modifications might be made in the precise details of the structure illustrated, and for these reasons only the following claims are intended to define my invention.

Having thus described my invention, I claim:

1. A lining ring assembly for a rock crusher having a crusher head including an upwardly facing frusto-conical surface centered about an upright axis and a coaxial mantle extension removably mounted on said crusher head about the center thereof and having a circular peripheral edge, comprising:

a circular mounting ring on the upwardly facing surface of the crusher head in coaxial alignment therewith, and said mounting ring being provided with an upper frusto-conical surface intersected by an outer shoulder having an inwardly facing surface coaxial with the crusher head surface and extending upwardly from the upper surface of said mounting ring;

and a plurality of segmented lining members which together form a circular ring, the lower surface of each lining member being formed complementary to the upper surface and shoulder of the mounting ring and the inner edges of the lining members, when placed upon the mounting ring, forming a circular surface complementary to the peripheral edge of the mantle extension and being adapted to be abutted thereby.

2. An assembly as defined in claim 1 wherein there are an even number of segmented lining members divided into pairs, each pair of segmented lining members including two members having end edges complementary to one another so as to interlock in the completed assembly.

3. An apparatus as defined in claim 1 wherein the upper frusto-conical surface of the circular mounting ring is non-parallel relative to the upwardly facing surface of the crusher head.

4. An apparatus as defined in claim 1 wherein the segmented lining members together form a circular ring having an upwardly facing frusto-conical surface parallel to the upwardly facing surface of the crusher head.

5. An assembly as defined in claim 1 wherein the mounting ring is made of hardened metal material, the segmented lining members being made of material sufficiently hard to withstand the grinding of rock thereon.

6. An assembly as defined in claim 1 wherein the end edges of the segmented lining members are offset from radial planes, the members being provided in complementary pairs.

7. An assembly as defined in claim 1 wherein the end surfaces of the segmented lining members lie in planes not parallel to the axis of the crusher head, said lining members being formed in complementary pairs.

*8. A lining ring assembly for a rock crusher having a generally frusto-conical crushing member centered about an upright axis and having a circular peripheral edge, comprising a circular outer shoulder on the crushing member having a continuous surface generally coaxial with the upright axis of the crusher and projecting from the crushing member in a generally axial direction, and a plurality of segmented lining members which together form a circular generally frusto-conical ring each having a backing surface and a crushing surface, the backing surface of each lining member being formed somewhat complementary to the shoulder on the crushing member to interlock therewith so that when a thrust is applied to the inner peripheral edges of the lining members, the interlocking shoulders on the lining members and sup-*

*porting surface will hold the lining members in position on the crushing member.*

*9. The structure of claim 8 further characterized in that the lower surfaces of the lining members are the backing surfaces and the lining members are constructed to be supported on the head of a crusher.*

*10. In a wearing assembly for a crushing part of a crusher of the gyrated head type, a circumferential, generally continuous mounting ring of a material of predetermined hardness, formed and adapted to extend about and to be supported against the crushing part, and a plurality of closely approaching surface members of a metal of substantially greater hardness than the material of the body, said surface members being mounted on and supported solely by the circumferential mounting ring, and being shaped and positioned to take substantially the entire crushing wear of the material crushed when the crusher is being operated.*

*11. The structure of claim 10 further characterized in that the surface members are removably supported by the mounting ring.*

*12. The structure of claim 10 further characterized in that the wearing assembly is constructed and adapted to be supported on the head of the crusher.*

*13. For use in a rock crusher having a crusher head including an upwardly facing, generally frusto-conical surface centered about a generally upright axis with the upper surface being intersected by an outer shoulder having an inwardly facing surface generally coaxial with the crusher head and surface and extending upwardly therefrom and a generally coaxial mantle extension removably mounted on said crusher head about the center thereof and having a circular peripheral edge, the improvement comprising a plurality of segmented lining members which together form a circular ring, the lower surface of each lining member being formed complimentary to the upper surface and shoulder of the crusher head, the inner edges of the lining members, when placed upon the crusher head, forming a circular surface complementary to the peripheral edge of the mantle extension and being adapted to be abutted thereby.*

*14. For use in a rock crusher having a generally frusto-conical crushing member centered about an upright axis and having a generally circular peripheral edge with a generally circular outer shoulder on the crushing member having a generally continuous surface coaxial with the upright axis of the crusher and projecting from the crushing member in a generally axial direction, the improvement comprising a lining ring assembly including a plurality of segmented lining members which together form a circular, generally frusto-conical ring, each having a backing surface and a crushing surface, the backing surface on each lining member being formed somewhat complementary to the shoulder of the crushing member to interlock therewith so that when a thrust is applied to the inner peripheral edges of the lining member, the interlocking shoulders on the lining members and supporting surface will hold the lining members in position on the crushing member.*

References Cited

The following references, cited by the Examiner, are of record in the patented file of this patent or the original patent.

UNITED STATES PATENTS

| | | | |
|---|---|---|---|
| 98,297 | 12/1869 | Pugh | 241—293 |
| 993,783 | 5/1911 | Mason | 241—295 |
| 1,038,794 | 9/1912 | Sholl | 241—209 |
| 1,054,123 | 2/1913 | Hutchinson | 241—300 |
| 1,087,204 | 2/1914 | Washburne | 241—295 |
| 1,914,151 | 6/1933 | Munroe | 241—295 X |
| 2,594,080 | 4/1952 | Shafter | 241—300 X |
| 3,097,803 | 7/1963 | Dorsey | 241—293 |
| 3,353,758 | 11/1967 | Whaley | 241—300 |
| 251,040 | 12/1881 | Gates | 241—294 |

ROBERT C. RIORDON, Primary Examiner

D. G. KELLY, Assistant Examiner